| United States Patent Office | 3,213,403
Patented Oct. 19, 1965 |
|---|---|

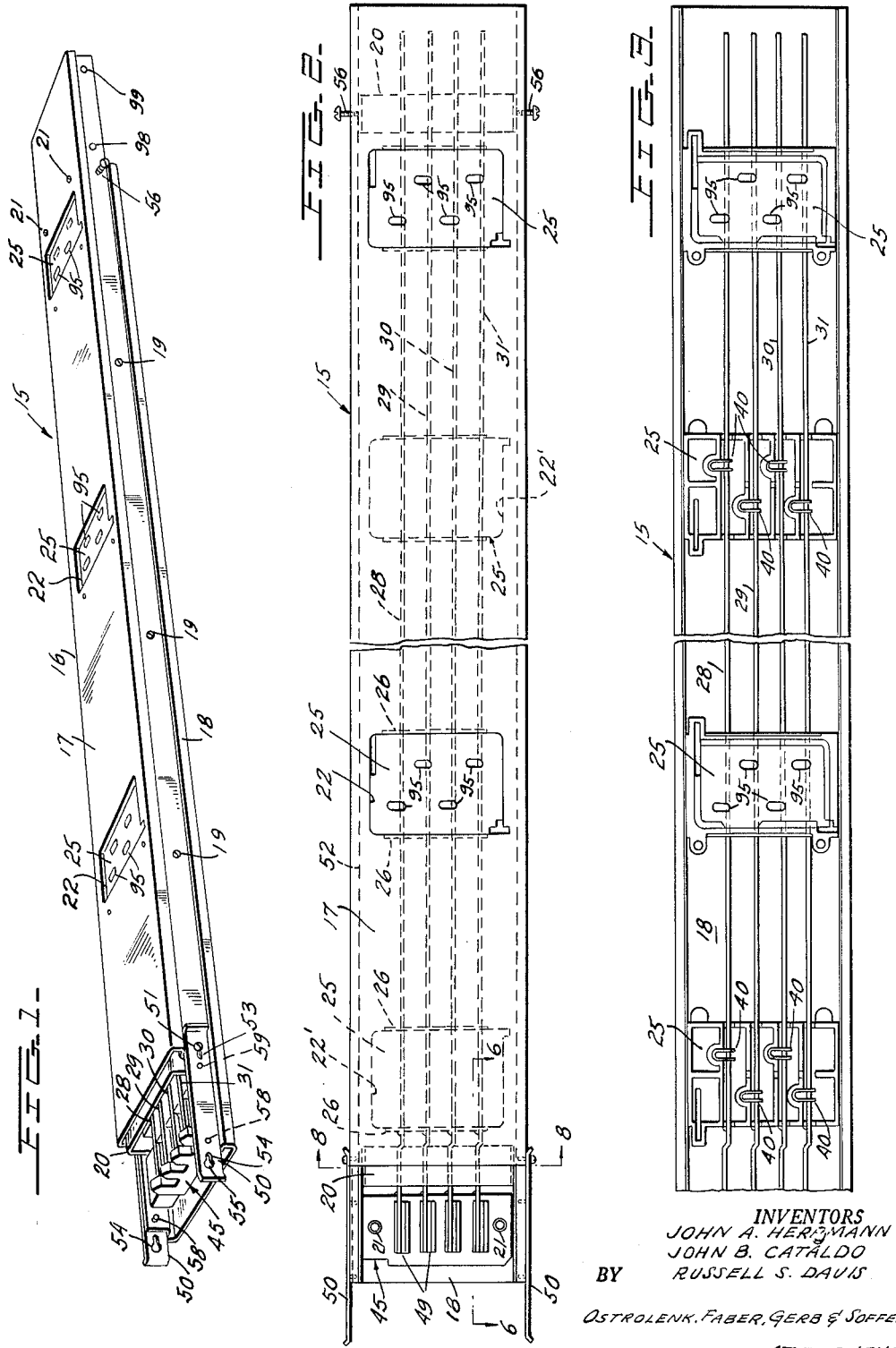

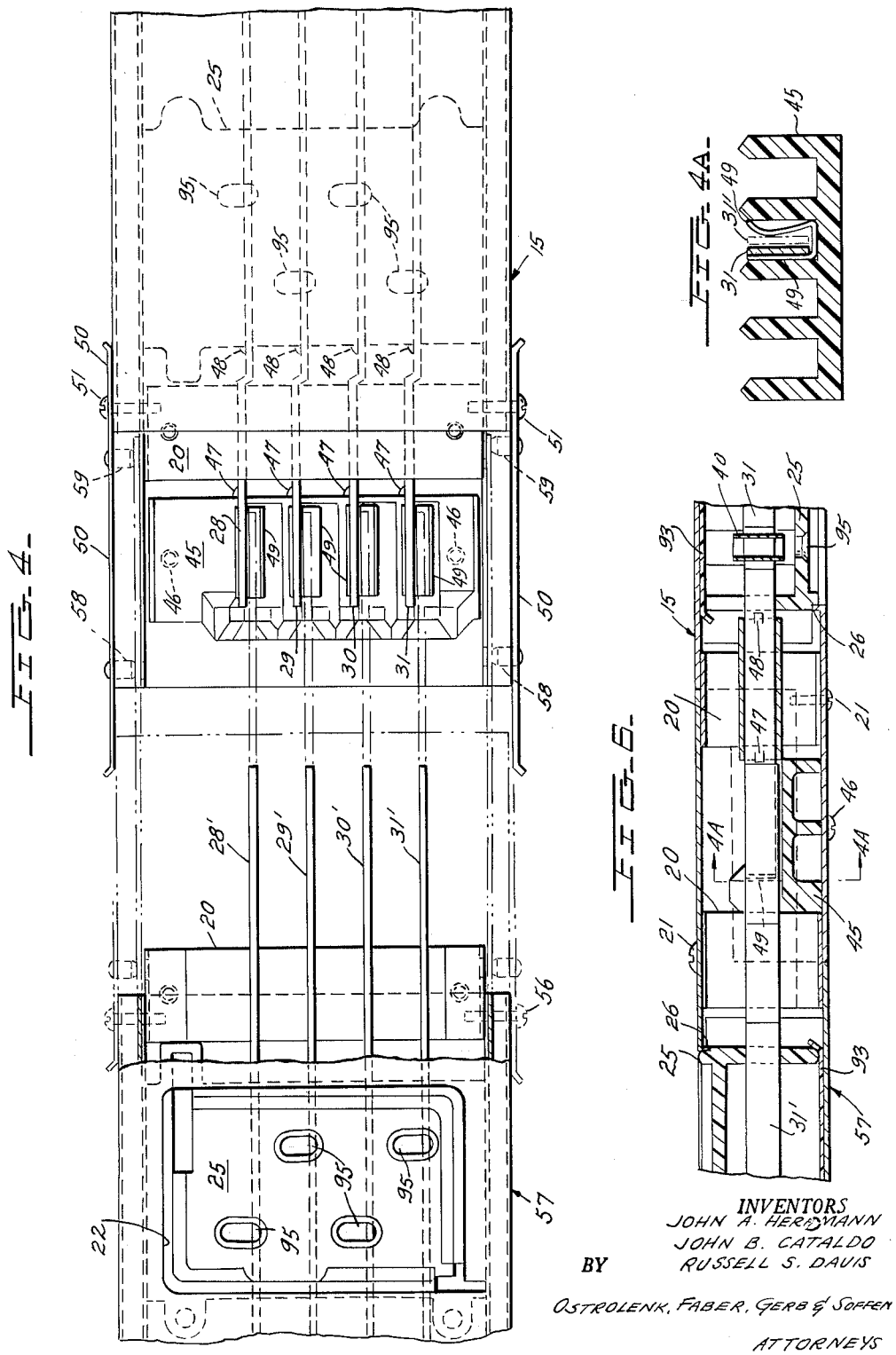

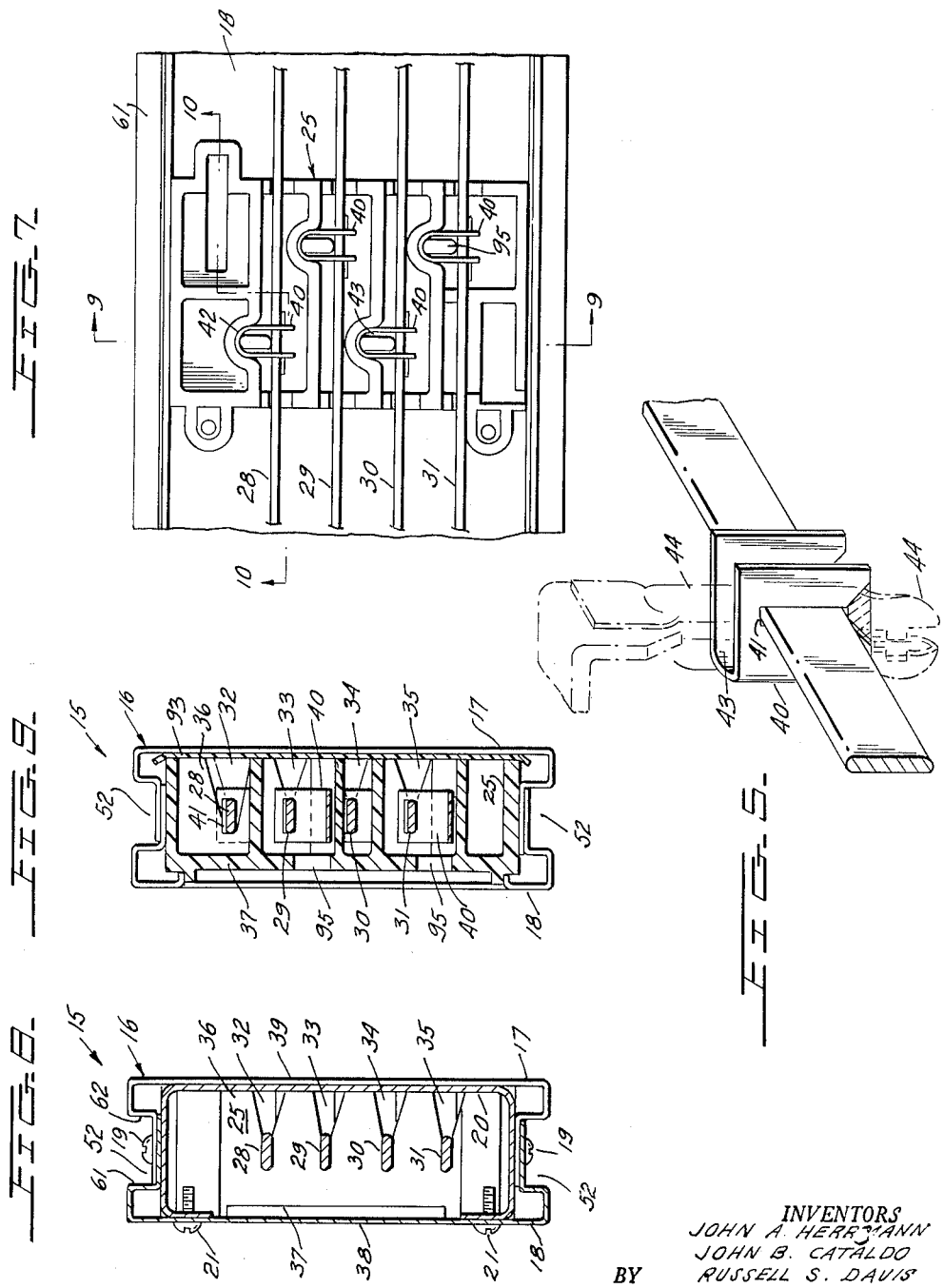

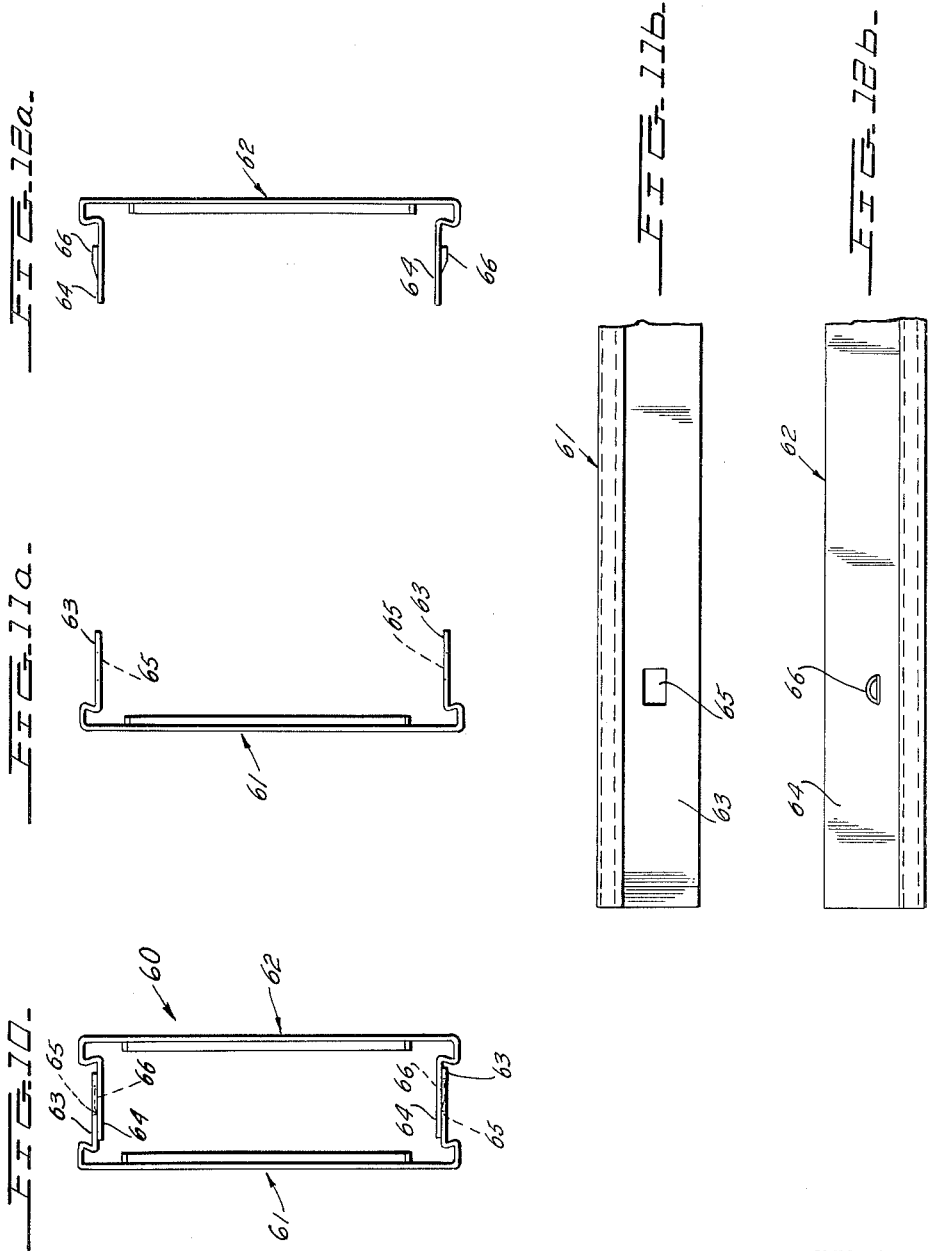

3,213,403
PLUG-IN BUS DUCT
John A. Hermann, Grosse Pointe Farms, John B. Cataldo, Bloomfield Hills, and Russell S. Davis, Detroit, Mich., assignors to I-T-E Circuit Breaker Company, Philadelphia, Pa., a corporation of Pennsylvania
Filed Mar. 24, 1961, Ser. No. 119,008
2 Claims. (Cl. 339—22)

This invention relates to bus ducts in general and more particularly to a novel bus duct construction which utilizes a minimum number of different elements so that costs are maintained at a minimum.

Briefly, a bus duct comprises a plurality of insulated spaced parallel bus conductors encased in metal housing. At longitudinally spaced locations along the housing, plug-in openings are provided so that the fingers of a plug-in unit may be inserted into the housing to engage the bus conductors therein for the tapping of power from the bus duct. Typically, a bus duct of the type to be hereinafter described is rated at 600 volts 100 amperes although with proper clearances the voltage rating may be increased and an increase in conductor size and ventilating conditions results in an increased current rating.

In the device of this invention, the duct housing is comprised of two substantially identical channel-like members mated with the arms thereof overlapping. Plug-in openings are provided in each of the channel sections with the plug-in openings of one channel section being staggered with relation to the plug-in openings of the other channel sections.

Insulating blocks individual to each of the housing openings are provided to cover these openings and prevent engagement of the bus bars by a human being yet permit plug-in unit contact fingers to be inserted and engage the bus bars. Each of the insulating blocks is provided with suitable parallel grooves for operatively positioning the bus bars.

In addition, U-shaped clips are mounted on each of the bus bars to cooperate therewith in defining pockets to receive the plug-in unit fingers. The clips are disposed within suitable cavities of the insulating blocks. Thus, the insulating blocks not only position the bus bars but also position the clip means.

For the electrical connection of adjacent bus sections, each bus section is provided at one end thereof with an insulating splice block having parallel grooves in which one end of each of the bus conductors is disposed. A U-shaped spring clip is provided for each of the bus conductors with the spring clips being maintained in position through the cooperation of the bus bars and splice block. Each spring clip is adapted to receive the overlapping ends of two bus bars from adjacent duct sections, with these bus bars being disposed between the arms of the U so that the spring clip exerts a biasing force urging these bus bars into good electrical engagement.

For mechanical securement of adjacent bus sections, each bus section carries two splice plates. Each splice plate carries a pair of locating pins and is provided with a pair of elongated slots. Each splice plate is slidingly mounted to the duct housing through the cooperation of one of the elongated slots with a screw. The other elongated slot is provided with an enlarged portion which is adapted to receive the head of the screw of the adjacent bus housing. When the locating pins are disposed within suitable locating apertures of adjacent bus section housings, the other elongated slot is so positioned with respect to its mating screw that the head of this screw will not pass through the slot when this screw means is tightened. Tightening of both screw means mechanically secures adjacent bus sections in place.

Accordingly, a primary object of this invention is to provide a novel bus duct which is especially economical to produce.

Another object of this invention is to provide a novel bus duct construction utilizing a minimum number of different elements.

Still another object is to provide a bus duct construction including insulator blocks which serve the dual function of maintaining the bus bars in spaced parallel insulating relationship and also positioning clip means which partially define plug-in pockets.

A further object is to provide a bus duct section having novel means for electrically and mechanically securing these adjacent bus duct sections.

A still further object of this invention is to provide a bus duct construction which includes rigid insulating blocks at each of the plug-in openings to achieve a deadfront construction thereby eliminating the necessity for having openable covers over the plug-in openings.

These as well as other objects of this invention shall become fully apparent after reading the following description of the accompanying drawings in which:

FIGURE 1 is a perspective of a bus duct section constructed in accordance with the teachings of the instant invention.

FIGURE 2 is a top elevation of the dus duct section of FIGURE 1.

FIGURE 3 is a fragmentary top elevation of the bus duct section of FIGURE 1 with one of the channels forming the housing removed to reveal the internal construction.

FIGURE 4 is an enlarged fragmentary side elevation illustrating the manner in which adjacent bus duct sections are joined.

FIGURE 4A is a partial cross-section taken through line 4A—4A of FIGURE 6 looking in the direction of arrows 4A—4A.

FIGURE 5 is a perspective illustrating the manner in which a plug-in unit contact finger is received by a clip.

FIGURE 6 is a cross-section taken through line 6—6 of FIGURE 2 looking in the direction of arrows 6—6, showing the joint between bus bars.

FIGURE 7 is an elevation of one of the rigid insulator blocks shown in FIG. 3, and illustrating the positions of the bus bars and pocket-forming clips mounted thereon.

FIGURE 8 is a cross-section taken through line 8—8 of the FIGURE 2 looking in the direction of the arrows.

FIGURE 9 is a cross-section taken through line 9—9 of the FIGURE 7 looking in the direction of the arrows.

FIGURE 10 is an end view of an alternative construction for the bus duct section.

FIGURES 11a and 11b are an end view and fragmentary side elevation of one of the housing members of FIGURE 10 while FIGURES 12a and 12b are similar views of the other housing member.

Bus duct section 15 is comprised of an elongated housing 16 of substantially rectangular cross-section. Housing 16 is formed of two channel sections 17, 18 joined along the overlapping arms thereof by screw means 19. At the left end, channel 18 extends beyond channel 17 while at the right end, channel 17 extends beyond channel 18. A U-shaped rabbet plate 20 with inward extensions at the free ends of the arms thereof is welded or otherwise secured to each of the channels 17, 18 at either end thereof and secured to the other channel by screw means 21. The rabbet plates 20 mechanically reinforce the ends of housing 16.

Each of the channels 17, 18 is provided with a plurality of plug-in openings 22 spaced along the axis of housing 16. It is to be noted that openings 22 of channel 17 are staggered in relation to openings 22′ of channel 18 for a purpose which will hereinafter become evident. An insulating block 25, constructed of rigid thermosetting plastic, is provided for each of the plug-in openings 22, 22' and is maintained in alignment with its respective plug-in opening by means of inwardly turned lips 26 at the side edges of plug-in openings 22, 22' which mate with suitable formations of block 25.

Bus duct section 15 is provided with four flat bus bars 28–31. Three of the bus bars 28–31 are usually connected to different phases of a three-phase electrical source and the fourth of the bus bars is connected to neutral. Each insulator 25 is provided with four slots 32–35 (FIGURES 8 and 9) which receive bus bars 28–31 respectively and maintain same in spaced insulated relationship parallel to the longitudinal axis of housing 16. Slots 32–35 extend from the back 36 of insulator 25 only part way to the front 37 thereof. Front 37 is slightly recessed from one of the larger surfaces of housing 16.

The bottoms of slots 32–35 of insulators 25 associated with plug-in openings 22, 22' of channel 18 position bus bars 28–31 relative to housing wall 38. Similarly, the bottoms of slots 32–35 of blocks 25 associated with plug-in openings 22, 22' of channel 17 establish the spacing between bus bars 28–31 and housing wall 39.

Bus duct section 15 further includes, for each of the bus bars 28–31 and for each of the insulator blocks 25, a U-shaped clip 40. Thus, in the embodiment illustrated there are four clips 40 associated with each insulator block 25.

As seen in FIG. 5 the arms of each U-shaped clip 40 are usually provided with closed elongated slots 41 through which the respective bus bars 28–31 pass. In the event that slot 41 is not provided with an open end, the clip 40 may be slid onto the bus bar with the insulating blocks being added to the assembly afterward. For some assembly procedures it has been found convenient to open one end of each of the clip slots 41 by the removal of the material comprising the cross hatched area of FIGURE 5.

The longitudinal spacing between clips 40 is maintained by insulator block cavities 42. As best seen in FIGURE 5, clip 40 cooperates with the bus bar on which it is mounted to form a pocket 43 adapted to receive contact finger 44 of a bus duct plug-in unit (not shown). Pockets 43 are aligned with apertures 95 of blocks 25.

In order to maintain insulation levels when contact finger 44 is long, as when a plug-in unit of high rating is utilized, insulating sheets 93 (FIGURE 6) are interposed between insulator back 36 and the interior of housing 16.

As seen in FIGURES 1, 2, 4 and 6 bus duct section 15 is provided at one of the ends thereof with insulating splice block 45 secured to channel 18 by screws 46. Splice block 45 includes suitable formations providing for parallel guideways for bus bars 28–31 whose left ends with respect to FIGURE 1 are disposed within these guideways. It is to be noted that the left ends of bus bars 28–31 are slightly offset as they enter the guideways of splice block 45. As can be seen in FIGURES 4 and 6, bus bar protrusions 47 abut the right side of splice block 45 to limit leftward movement of bus bars 28–31 while bus bar protrusions 48 abut the left side of the leftmost insulator block 25 to limit movement of bus bars 28–31 to the right.

Also mounted on splice block 45 (FIGURE 4) within suitable cavities thereof are U-shaped spring clips 49. There is an individual spring clip 49 for each of the bus bars 28–31 with the respective bus bars being disposed between the U-arms of spring clip 49. When two bus duct sections are mated, the right ends of the bus bars in the bus duct section to the left are received by splice block 45 of the bus duct section to the right and positioned so as to overlap the bus bar of corresponding phase. The spring clips 49 then urge the overlapping bus bars into good electrical contact. The bus bars of a mating section might be tapered as shown at 15' in FIGURE 4 of the patent to L. E. Fisher, No. 2,906,811, for example, or the clip 49 may be funnel-like at its front opening to allow the mating bus bars to enter.

Two splice plates 50 are mounted on the end of housing 16 having splice block 45. Each splice plate 50 is slidingly mounted on housing 16 by screw 51 which extends outwardly from the bottom of longitudinally-extending depression 52 (FIGURES 8 and 9) formed in the smaller wall of housing 16. The threaded body of screw 51 passes through elongated slot 53 (FIGURE 1) of splice plate 50.

Splice plate 50 further includes another elongated slot 54 having an enlarged end 55 through which the head of screw 56 of adjacent bus section 57 can pass (FIGURE 4). The longitudinal axes of slots 53, 54 are aligned. Two locating pins 58, 59 extend inwardly from splice plate 50 and are provided with cone-shaped free ends so as to readily enter locating apertures of adjacent bus duct section housings corresponding to apertures 98, 99 of section 15.

Adjacent bus sections 15, 57 are mechanically secured to one another by placing the sections 15, 57 in axial alignment and entering the bus bars of section 57 into splice block 45 until these bus bars are in the phantom position of FIGURE 4. With screw 51 positioned so as to loosely retain splice plate 50, splice plate 50 may be positioned so that the enlarged portion 55 of slot 54 can receive the head of screw 56. Thereafter, splice plate 50 is moved to the left until locating pins 58, 59 thereof are in alignment with the locating apertures 98, 99 of bus duct sections 57, 15 respectively. At this time the body of screw 56 is in the narrow portion of elongated slot 54. Screws 51 and 56 are then tightened thereby bringing splice plate 50 to the bottom of housing depression 52. The side walls 61, 62 of depression 52 are spaced apart by a distance substantially equal to the width of splice plate 50 to add to the mechanical stability of the joint.

Thus this invention provides a bus duct construction requiring a minimum number of different elements. That is both housing sections are formed of substantially identical channels 17, 18. All of the insulator blocks 25 are of identical construction and each of the bus bars 28–31 is of identical construction.

Assembly is particularly simple in that the pocket-forming clips 40 are automatically positioned in operative relationship by means of cavities in insulator blocks 25 while the insulator blocks 25 are automatically positioned by the inwardly-turned lips 26 defining plug-in openings 22. It is to be noted that insulator blocks 25 also establish the parallel positions for bus bars 28–31. The utilization of insulator blocks 25 eliminates the necessity for providing plug-in openings 22 with safety covers.

Electrical connections between bus duct sections are simplified by the utilization of splice block 45 in conjunction with spring clips 49. Mechanical connections between adjacent bus sections are readily made by the utilization of splice plates 50. It is to be noted that screws 51 which mount splice plates 50 on housing 16 have the ends opposite their heads spread so that screws 51 cannot be dismounted from housing 16. In turn, splice plates 50 cannot be dismounted from housing 16 so that splice plates 50 cannot be misplaced. During shipping, splice plates 50 are pivoted 180° from their positions of FIGURE 4 and screws 51 are tightened.

FIGURES 10–12B illustrate an alternative construction for the bus duct section. In this embodiment elongated housing 60 is comprised of confronting channel sections 61, 62 with both arms 63 of section 61 overlapping and lying outboard of both arms 64 of section 62. Arms 64 are provided with longitudinally spaced outboard embossments 66 which are disposed within slots 65.

Housing 60 is assembled by mounting the bus bars, insulating blocks, and insulating sheet material on channel 62. Thereafter channel 61 is forced over channel 62 with arms 63 spreading as they pass over embossments 66 until such time as embossments 66 enter slots 65. When this occurs, channels 61, 62 are self-locked to one another so that securement is accomplished without the necessity of screws 19 as in the embodiment of FIGURES 1–9.

In the foregoing, the invention has been described only in connection with preferred embodiments thereof. Many variations and modifications of the principles of the invention within the scope of the description herein are obvious. Accordingly, it is to be limited not by the specific disclosure herein but only by the appended claims.

We claim:

1. A bus duct section comprising an elongated housing, a plurality of spaced bus bars within said housing extending parallel to the longitudinal axis of the housing, said housing having a plurality of openings in a first wall thereof, an insulator block for each of said openings disposed within said housing in alignment with one of said openings, each of said blocks having a plurality of apertures therein through which plug-in unit contact fingers are insertable to engage said bus bars; splice plates slidingly mounted on said housing near an end thereof by cooperating pin and closed-ended elongated slot means; each of said splice plates carrying pin means adapted to be entered into locating apertures of said housing and a housing of an adjacent duct section; each of said splice plates having another closed-ended elongated slot for cooperating with pin means of an adjacent duct section housing for operatively connecting adjacent bus section.

2. A bus duct section comprising in elongated housing, a plurality of spaced bus bars within said housing extending parallel to the longitudinal axis of the housing, said housing having a plurality of openings in a first wall thereof, an insulator block for each of said openings disposed within said housing in alignment with one of said openings, each of said blocks having a plurality of apertures therein through which plug-in unit contact fingers are insertable to engage said bus bars; each of the smaller walls of the housing having a longitudinally extending depression therein; a splice plate for each of said depressions, each of said plates slidingly mounted on said housing by a mounting screw extending outwardly from the bottom of one of the depressions in cooperation with a first elongated groove of said plate, said plate having a second elongated groove aligned with said first groove and adapted to receive a mounting screw of an adjacent bus section, said splice plate having at least two locating pins one of which is adapted to be received by a locating aperture at the bottom of said depression and the other pin being adapted to be received by a similar locating aperture of an adjacent bus duct section, each of said depressions being defined by sidewalls which are closely fitted to the side edges of said plate.

References Cited by the Examiner

UNITED STATES PATENTS

| 2,254,147 | 8/41 | Horn | 191—23 |
| 2,264,075 | 11/41 | Frank | 339—22 |
| 2,306,353 | 12/42 | Cole et al. | 339—22 |
| 2,317,710 | 4/43 | Anderson | 339—176 |
| 2,318,860 | 5/43 | Hugulet | 339—22 |
| 2,478,143 | 8/49 | Watts | 339—258 X |
| 2,686,297 | 8/54 | Hutt | 339—14 |
| 2,906,811 | 9/59 | Fisher | 174—99 |
| 2,912,603 | 11/59 | Farnsworth | 307—147 |
| 2,932,686 | 4/60 | Herrmann | 174—88 |
| 2,997,555 | 8/61 | Carlson et al. | 339—22 X |
| 2,997,685 | 8/61 | Anderson | 339—22 X |

JOSEPH D. SEERS, *Primary Examiner.*

ALFRED S. TRASK, *Examiner.*